(12) United States Patent
Johnson et al.

(10) Patent No.: US 12,019,258 B2
(45) Date of Patent: Jun. 25, 2024

(54) MULTILAYER REFLECTIVE POLARIZER WITH CRYSTALLINE LOW INDEX LAYERS

(71) Applicant: 3M INNOVATIVE PROPERTIES COMPANY, St. Paul, MN (US)

(72) Inventors: Matthew B. Johnson, Woodbury, MN (US); Adam D. Haag, Woodbury, MN (US); Carl A. Stover, St. Paul, MN (US); Timothy J. Nevitt, Red Wing, MN (US); William F. Edmonds, Chavannes-des-Bois (CH); Stephen A. Johnson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 518 days.

(21) Appl. No.: 17/273,047

(22) PCT Filed: Aug. 29, 2019

(86) PCT No.: PCT/IB2019/057289
§ 371 (c)(1),
(2) Date: Mar. 3, 2021

(87) PCT Pub. No.: WO2020/049424
PCT Pub. Date: Mar. 12, 2020

(65) Prior Publication Data
US 2021/0325587 A1 Oct. 21, 2021

Related U.S. Application Data

(60) Provisional application No. 62/727,947, filed on Sep. 6, 2018.

(51) Int. Cl.
*G02B 5/30* (2006.01)
*B32B 7/023* (2019.01)

(52) U.S. Cl.
CPC ............. *G02B 5/305* (2013.01); *B32B 7/023* (2019.01); *G02B 5/3016* (2013.01);
(Continued)

(58) Field of Classification Search
CPC .... G02B 5/306; G02B 5/3018; G02B 5/3083; B32B 7/023; C09K 2323/03; C09K 2323/031
(Continued)

(56) References Cited

U.S. PATENT DOCUMENTS 3,610,729 A 10/1971 Rogers
4,446,305 A 5/1984 Rogers
(Continued)

FOREIGN PATENT DOCUMENTS

JP 2011213770 A 10/2011
WO WO 1995-017303 6/1995
(Continued)

OTHER PUBLICATIONS

Denker, "Advanced Polarizer Film for Improved Performance of Liquid Crystal Displays", 45.1: Invited Paper, presented at Society for Information Displays (SID) International Conference in San Francisco, 2006, pp. 1528-1530.
(Continued)

*Primary Examiner* — Ruiyun Zhang
(74) *Attorney, Agent, or Firm* — Clifton F. Richardson

(57) ABSTRACT

Multilayer reflective polarizers are described. In particular, multilayer reflective polarizers that include both crystalline high index layers and low index layers are disclosed. These reflective polarizers may be particularly suitable for automotive, architectural, and industrial applications.

19 Claims, 8 Drawing Sheets

(52) U.S. Cl.
CPC ........ *G02B 5/3083* (2013.01); *C09K 2323/03* (2020.08); *C09K 2323/031* (2020.08)

(58) Field of Classification Search
USPC .......................................... 428/1.1, 1.3, 1.31
See application file for complete search history.

(56) References Cited

U.S. PATENT DOCUMENTS

| | | | |
|---|---|---|---|
| 4,540,623 | A | 9/1985 | Im |
| 5,103,337 | A | 4/1992 | Schrenk |
| 5,360,659 | A | 11/1994 | Arends |
| 5,448,404 | A | 9/1995 | Schrenk |
| 5,882,774 | A | 3/1999 | Jonza |
| 6,157,490 | A | 12/2000 | Wheatley |
| 6,368,699 | B1 | 4/2002 | Gilbert |
| 6,531,230 | B1 | 3/2003 | Weber |
| 6,783,349 | B2 | 8/2004 | Neavin |
| 2002/0005986 | A1* | 1/2002 | Hebrink ............... B32B 27/08 359/489.15 |
| 2003/0072931 | A1 | 4/2003 | Hebrink |
| 2007/0047080 | A1 | 3/2007 | Stover |
| 2011/0102891 | A1 | 5/2011 | Derks et al. |
| 2017/0329060 | A1* | 11/2017 | Tai .......................... G02B 5/305 |

FOREIGN PATENT DOCUMENTS

| | | |
|---|---|---|
| WO | 9701778 A1 | 1/1997 |
| WO | 9936257 A1 | 7/1999 |
| WO | WO 1999-039224 | 8/1999 |
| WO | 2005017600 A1 | 2/2005 |
| WO | WO 2009-014926 | 1/2009 |
| WO | WO 2012-005879 | 1/2012 |
| WO | 2015077249 A1 | 5/2015 |
| WO | 2018013784 A2 | 1/2018 |
| WO | WO 2019-145860 | 8/2019 |

OTHER PUBLICATIONS

MacLeod, "Thin-Film Optical Filters", Second Edition, 1986, 5 pages.
Thelan, "Design of Optical Interference Filters", 1989, 7 pages.
Weber, "Giant Birefringent Optics in Multilayer Polymer Mirrors", Science, 2000, vol. 287, pp. 2451-2457.
International Search Report for PCT International Application No. PCT/IB2019/057289, mailed on Dec. 16, 2019, 4 pages.

* cited by examiner

MULTILAYER REFLECTIVE POLARIZER WITH CRYSTALLINE LOW INDEX LAYERS

BACKGROUND

Multilayer reflective polarizes are optical films generally formed of alternating polymer layers, oriented such that the difference in refractive indices between the alternating polymer layers cause light of one orthogonal polarization to be substantially reflected, while the other is substantially transmitted. Through layer stack design and material selection, the multilayer reflective polarizer can polarize light over a desired range of visible and infrared wavelengths.

SUMMARY

In one aspect, the present description relates to a multilayer reflective polarizer. The multilayer reflective polarizer includes a plurality of alternating first polymer layers and second polymer layers. Each of the first polymer layers and the second polymer layers has an in-plane birefringence of at least 0.01. For at least one in-plane direction, the difference in refractive index between each of the first polymer layers and the second polymer layers is at least 0.04. For a second in-plane direction orthogonal to the at least one in-plane direction, the difference in refractive index between each of the first polymer layers and the second polymer layers is less than 0.04. The multilayer reflective polarizer has at least four edges and no index of refraction for either of the first or second polymer layers, measured at 550 nm, is greater than 1.7.

DETAILED DESCRIPTION

Figure 1:
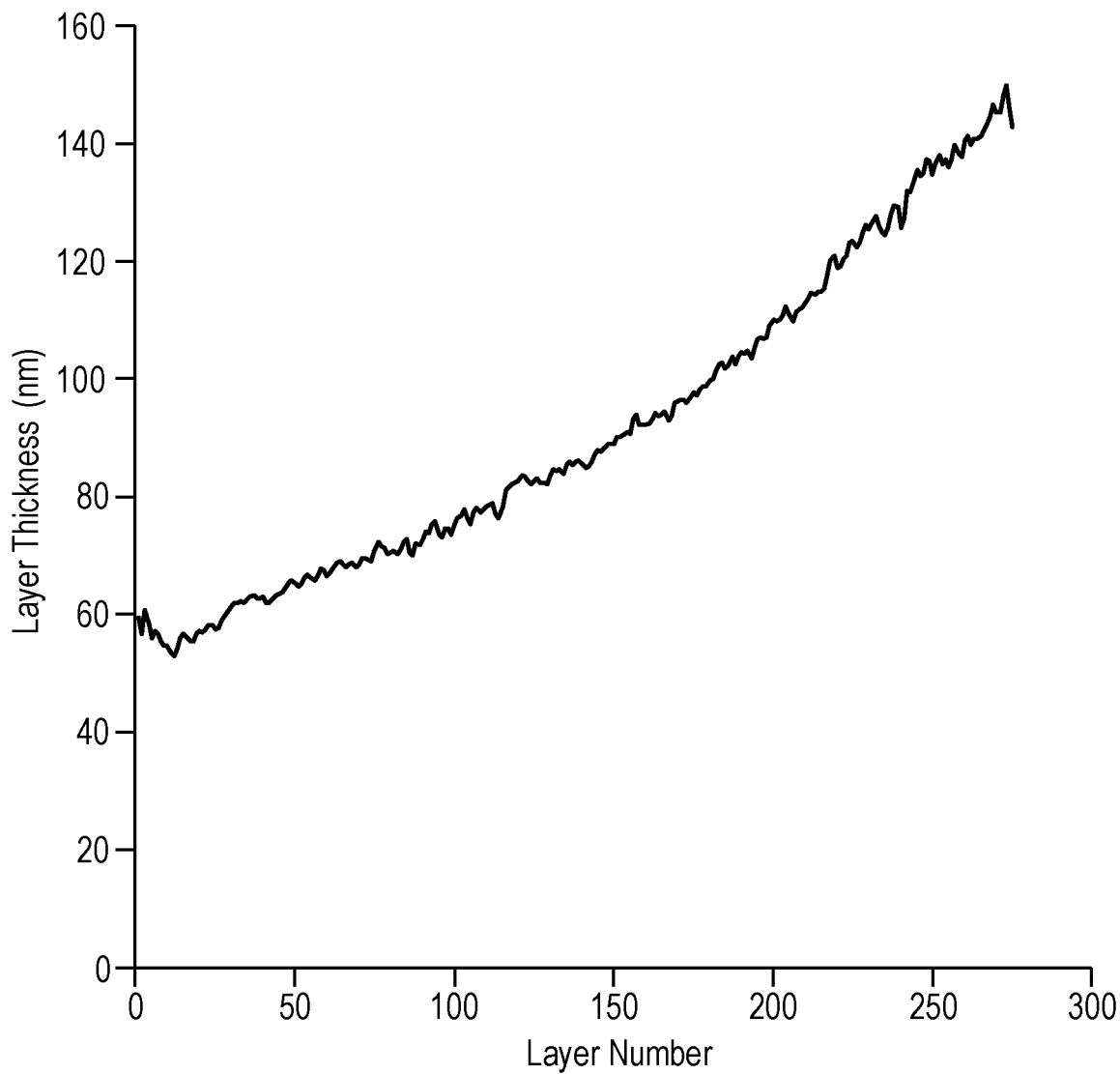
FIG. 1 is a graph of the layer thickness profile for Example 1.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters,* 2nd Ed., Macmillan Publishing Co. (1986) and by A. Thelan, *Design of Optical Interference Filters,* McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. Thicker layers may be included, such as skin layers at the outer surfaces of the multilayer optical film, or protective boundary layers (PBLs) disposed within the multilayer optical films, that separate coherent groupings (referred to herein as "packets") of microlayers.

For polarizing applications, e.g., for reflective polarizers, at least some of the optical layers are formed using birefringent polymers, in which the polymer's index of refraction has differing values along orthogonal Cartesian axes of the polymer. Generally, birefringent polymer microlayers have their orthogonal Cartesian axes defined by the normal to the layer plane (z-axis), with the x-axis and y-axis lying within the layer plane. Birefringent polymers can also be used in non-polarizing applications.

In some cases, the microlayers have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength X is twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \geq n_{2x}$, i.e., $\Delta n_x \geq 0$.

In practice, the refractive indices are controlled by judicious materials selection and processing conditions. A conventional multilayer film is made by co-extrusion of a large number, e.g. tens or hundreds of layers of two alternating polymers A, B, possibly followed by passing the multilayer extrudate through one or more multiplication die, and then stretching or otherwise orienting the extrudate to form a final film. The resulting film is typically composed of many of individual microlayers—hundreds or many hundreds—whose thicknesses and refractive indices are tailored to provide one or more reflection bands in desired region(s) of the spectrum, such as in the visible or near infrared. To achieve desired reflectivities with a reasonable number of layers, adjacent microlayers typically exhibit a difference in refractive index ($\Delta n_x$) for light polarized along the x-axis of at least 0.04. In some embodiments, materials are selected such that the difference in refractive index for light polarized along the x-axis is as high as possible after orientation. If reflectivity is desired for two orthogonal polarizations, then the adjacent microlayers also can be made to exhibit a difference in refractive index ($\Delta n_y$) for light polarized along the y-axis of at least 0.04.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

The '774 (Jonza et al.) patent also discusses certain design considerations relating to multilayer optical films configured as polarizers, referred to as multilayer reflecting or reflective polarizers. In many applications, the ideal reflecting polarizer has high reflectance along one axis (the "extinction" or "block" axis) and zero reflectance along the other axis (the "transmission" or "pass" axis). For the purposes of this application, light whose polarization state is substantially aligned with the pass axis or transmission axis is referred to as pass light and light whose polarization state is substantially aligned with the block axis or extinction axis is referred to as block light. Unless otherwise indicated, pass light at 60° incidence is measured in p-polarized pass light. If some reflectivity occurs along the transmission axis, the efficiency of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices n1y and n2y. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

Another design consideration discussed in '774 (Jonza et al.) relates to surface reflections at the air interfaces of the multilayer reflecting polarizer. Unless the polarizer is laminated on both sides to an existing glass component or to another existing film with clear optical adhesive, such surface reflections will reduce the transmission of light of the desired polarization in the optical system. Thus, in some cases it may be useful to add an antireflection (AR) coating to the reflecting polarizer.

Reflective polarizers are often used in visual display systems such as liquid crystal displays. These systems—now found in a wide variety of electronic devices such as mobile phones, computers including tablets, notebooks, and subnotebooks, and some flat panel TVs—use a liquid crystal (LC) panel illuminated from behind with an extended area backlight. The reflective polarizer is placed over or otherwise incorporated into the backlight to transmit light of a polarization state useable by the LC panel from the backlight to the LC panel. Light of an orthogonal polarization state, which is not useable by the LC panel, is reflected back into the backlight, where it can eventually be reflected back towards the LC panel and at least partially converted to the useable polarization state, thus "recycling" light that would normally be lost, and increasing the resulting brightness and overall efficiency of the display.

In certain embodiments, multilayer reflective polarizers may be useful in automotive applications. For example, multilayer reflective polarizers may be used on or near at least a portion of a vehicle windshield. This application differs significantly from traditional liquid crystal display applications, because—for safety reasons—a driver should still be able to observe the road or surrounding environment through the multilayer reflective polarizer. Further, other drivers should not be dazzled or have their vision impaired by a bright reflection off the driver's windshield. The highly reflective (for one polarization state), high performance traditional reflective polarizer will not meet these requirements.

Further, previously known reflective polarizers are sensitive to the processing and environmental exposure involved in automotive assembly and general use. For example, reflective polarizers may be used with, processed with, or laminated to polyvinyl butyral (PVB) for safety glass shatter resistance. A component of the PVB-based material can penetrate and degrade conventionally made and designed reflective polarizers under the high-temperature processing used to form laminated windshield components. As another example, polyethylene naphthalates—particularly polyethylene naphthalates (PEN) including NDC (dimethyl-2,6-naphthalenedicarboxylate)—which are used as polymers and/or copolymers in many commercially available reflective polarizers, will yellow when exposed to ultraviolet radiation. The vehicle environment provides ample exposure to solar radiation, which will degrade the reflective polarizer over time. In such an ambient environment, spontaneous large-size crystallization may also occur, developing haze in the reflective polarizer. In some embodiments, reflective polarizers described herein do not include polyethylene naphthalate. In some embodiments, reflective polarizers described herein do not contain naphthalene-2,6-dicarboxylic acid. In some embodiments, reflective polarizers described herein do not have a refractive index in any layer, along any direction, greater than 1.7, measured at 550 nm.

Multilayer optical films are typically formed from alternating layers of two different polymers. One layer is a layer capable of developing birefringence when oriented. Because almost all polymers used in the formation of multilayer optical films increase in refractive index when stretched, this layer is also typically known as the high index layer (or "high index optics" or HIO). The other layer of the alternating polymer layers is typically an isotropic layer, equal or less than the indices of refraction of the high index layer. For this reason, this layer is typically referred to as the low index layer (or "low index optics" or LIO). Conventionally, the high index layer is crystalline or semi-crystalline, while the low index layer is amorphous. This is at least based on the belief that in order to get high enough block axis reflectivity (based on the mismatch between the high index layer and the low index layer along a certain in-plane direction) and low enough pass axis reflectivity (based on the matching between the high index layer and the low index layer along a second, orthogonal in-plane direction), an amorphous material would be required.

It has now surprisingly been found that a multilayer reflective polarizer with both high index layers and low index layers that have some degree of crystallinity developed during stretching due to the low stretching temperature of polyethylene terephthalate are especially suited for these automotive applications. Additionally, it has surprisingly been found that multilayer reflective polarizers in which both the high index optics and the low index optics both develop asymmetric index of refraction increases through stretching can be useful in automotive application. In some embodiments, each of the high index layers and the low index layers may develop or have an in-plane birefringence of at least 0.01. In some embodiments, along one in-plane direction, the difference between the high index layers and the low index layers may be at least 0.04, but along a second, orthogonal in-plane direction, the difference may be less than 0.04. During certain intermediate stretching steps, certain multilayer optical films may have similar birefringent properties; however, these films were subsequently subject to a heat setting process that minimized the birefringence in at least one of the layers (typically the low index, or isotropic layer) in order to maximize the block axis (stretch axis) reflectivity, meaning the final film (i.e., the film in roll form or the converted film with at least four edges) did not exhibit these properties.

In some embodiments, the high index layers are selected to be polyethylene terephthalate (PET) and the low index layers are selected to be a copolyester of polyethylene terephthalate with cyclohexane dimethanol used as a glycol modifier (PETG, such as available from Eastman Chemicals, Knoxville, Tenn.). In some embodiments, the high index layers are selected to be PET and the low index layers are selected to be a 50:50 blend of PETG and PCTG (also a polyethylene terephthalate with cyclohexane dimethanol as a glycol modifier, but with twice the modifier as for PETG, available from Eastman Chemicals, Knoxville, Tenn.). In some embodiments, the high index layers are selected to be PET and the low index layers are selected to be a 33:33:33 blend of PETG, PCTG, and an "80:20" copolyester having 40 mol % terephthalic acid, 10 mol % isophthalic acid, 49.75 mol % ethylene glycol, and 0.25 mol % trimethyl propanol. Other copolyesters may be useful as or in low index layers described herein.

Reflective polarizers including materials such as the exemplary sets above surprisingly exhibit better inhibition of haze after high temperature exposure, due to the crystallization being developed gradually during processing rather than spontaneously (with accompanying larger crystal sites) during exposure to radiation or heat. Further, cosmetic and appearance issues such as microwrinkle or delamination appear to occur significantly less frequently with the crystalline materials combinations exemplified herein.

Shrinkage—particularly along the direction of greatest stretch—may be larger than conventional reflective polarizers. However, the amount of shrinkage can be controlled by a heat setting step, and in the manufacturing and assembly processes for automotive, a certain amount of shrinkage is desired. For example, reflective polarizers for automotive applications may include or be laminated to an automotive window film—that is, a film that reflects infrared light without substantially reflecting light in the visible spectrum. Automotive window films, such as those available from 3M Company, are typically alternating layers of PET and a co-poly(methyl methacrylate) (PMMA). Because the shrinkage is similar between the two films, laminates of the two films have a low tendency to wrinkle or warp after temperature changes. Reflective polarizers with crystallinity in both the high index and the low index layers also perform better with respect to chemical resistance and permeability (edge ingress) of other materials.

Reflective polarizers described herein also may have an f-ratio that is higher than 0.5. In some embodiments, the f-ratio may be greater than 0.55, greater than 0.6, greater than 0.65, greater than 0.7, greater than 0.75, greater than 0.8 or even greater than 0.85. The shift in f-ratio higher than 0.5 dampens the first order reflection bands of the multilayer reflective polarizer in favor of higher order reflection bands, effectively reducing the reflectivity of the polarizer for the designed wavelength range. Similar optical effects are observed for f-ratios lower than 0.5; for example, f-ratios less than 0.45, less than 0.4, less than 0.35, less than 0.3, less than 0.25, less than 0.2, or even less than 0.15. Combined with the lesser developed birefringence that occurs from stretching PET (compared to PEN or a coPEN), these reflective polarizers require more layers to reach sufficient levels of reflectivity. Counterintuitively, this is a design feature. For weak reflective polarizers such as those described herein, microlayer caliper variation can have an enormous and disproportionate effect on the overall spectrum of the film. By making each individual microlayer pair even weaker, layers can be added to the design that reinforce and overlap the reflective bands of neighboring microlayer pairs. This smooths the spectrum and allows for more consistent performance, regardless of position on the film web or even from roll to roll. Reflective polarizers described herein may have more than 100 layers, more than 150 layers, more than 200 layers, more than 250 layers, or even more than 300 layers.

Reflective polarizers described herein may have resistance to haze even after exposure to heat. In some embodiments, reflective polarizers may not have more than 1% haze when measured after 100 hours' exposure to 85° C., 95° C., or even 105° C. In some embodiments, reflective polarizers may have not more than 2% haze after 100 hours' exposure to 105° C. or even 120° C. In some embodiments, reflective polarizers may have no more than 3% or 3.5% haze after 100 hours' exposure to 120° C. In some embodiments, the transmission of these reflective polarizers may not be affected by even a short exposure to extreme heat, such as in an annealing step. In some embodiments, the transmission spectrum from 400 nm to 800 nm drops by no more than 10% or even no more than 5% after a 232° C. (450° F.) for 30 seconds annealing step.

Reflective polarizers as described herein are useful for automotive applications, but can also be used or suitable for certain polarizing beam splitter/view combiner applications. For example, for certain augmented reality displays or display devices, a generated and projected image may be superimposed over a wearer's frame of view. Many of the advantages that may be suitable for, for example, a heads up display for automotive applications, may be similarly desirable in these augmented reality applications. Reflective polarizers as described herein are also useful in architectural applications (both exterior and interior windows) and industrial window and glass applications. In some architectural application, reflective polarizers as described herein may configured so that they prevent viewing of a polarized display surface (such as a television or a laptop computer) from outside the room.

When multilayer reflective polarizers as described herein are combined with or laminated to automotive glass, the multilayer reflective polarizer may be configured such that it will reflect light polarized parallel to a road surface to reduce perceived glare off the road surface, or perpendicularly to a road surface as to be viewable with polarized sunglasses.

EXAMPLES

Example 1

Figure 2:
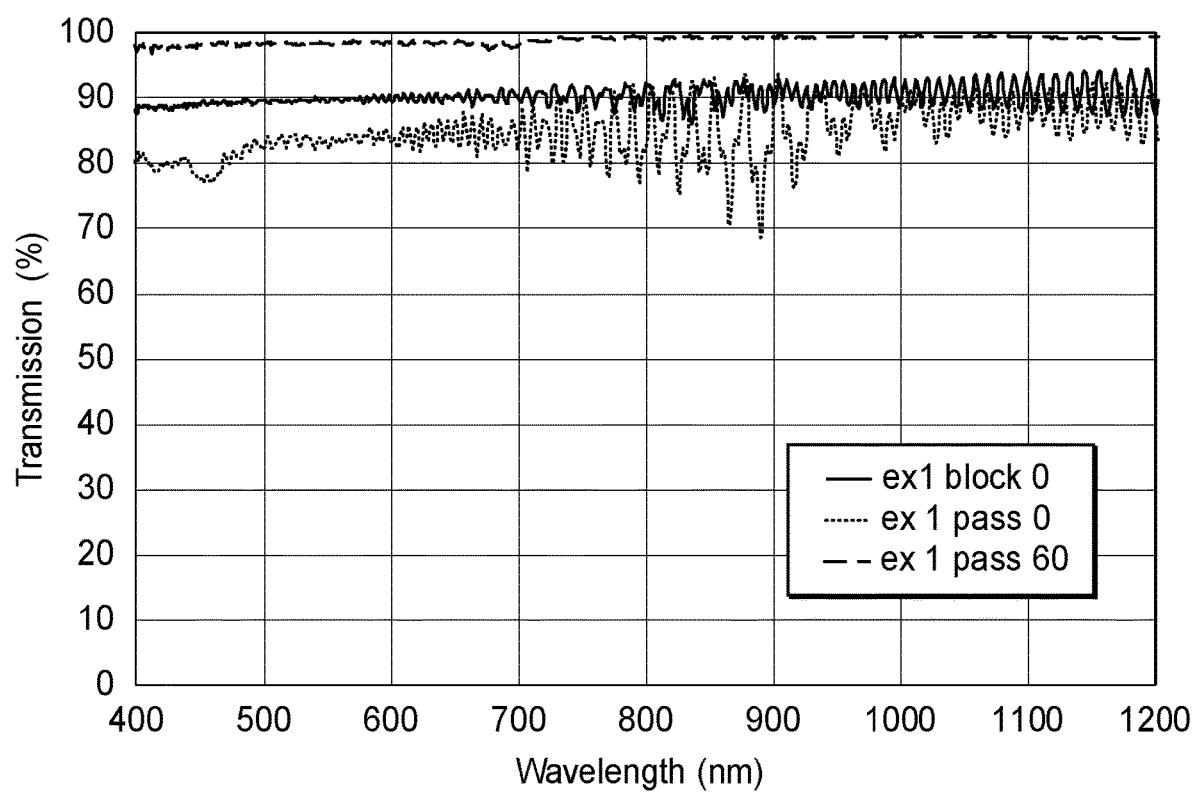
FIG. 2 is a graph of transmission spectra for Example 1.

A birefringent reflective polarizer was prepared as follows. Two polymers were used for the optical layers. The first polymer (first optical layers) was EASTAPAK PET 7352 available from Eastman Chemicals (Knoxville, TN). The second polymer (second optical layers) was polyethylene terephthalate glycol (PETG) GN071 from Eastman Chemicals. The ratio of the feed rate of the first polymer to the second polymer was chosen to make the optical layers have a f-ratio of 0.75. The polymer used for the skin layers was EASTAPAK PET 7352. The materials were fed from separate extruders to a multilayer coextrusion feedblock, in which they were assembled into a packet of 275 alternating optical layers, plus a thicker protective boundary layer of the first optical layers, on each side, for a total of 277 layers. The skin layers of the second optical layer material were added to both sides of the construction in a manifold specific to that purpose, resulting in a final construction having 279 layers. The multilayer melt was then cast through a film die onto a chill roll, in the conventional manner for polyester films, upon which it was quenched. The cast web was then stretched in a commercial scale linear tenter at a draw ratio approximately 6:1 and a temperature of 225F in the stretching section. The heat set section had a temperature of 350 F. The layer thickness profile is shown in FIG. 1. The layer profile, first polymer and second polymer materials, and chosen process conditions led to the resulting pass and block state transmission spectra shown in FIG. 2. This film has a resulting physical thickness as measured by a capacitance gauge of approximately 29.2 μm. The shrinkage measured at 302 F was 2.1% in the machine direction (MD) of the coextrusion equipment and 1.9% in the transverse direction (TD) of the coextrusion equipment. The shrinkage of the film was measured by heating a 1 inch by 9 inch strip of film to the desired temperature and measuring the shrinkage in the long direction of the sample after 15 minutes. The sample is under negligible tension sufficient to keep the film flat during the test. For some end use applications the film would have nearly identical shrinkage for the orthogonal directions.

Figure 3:
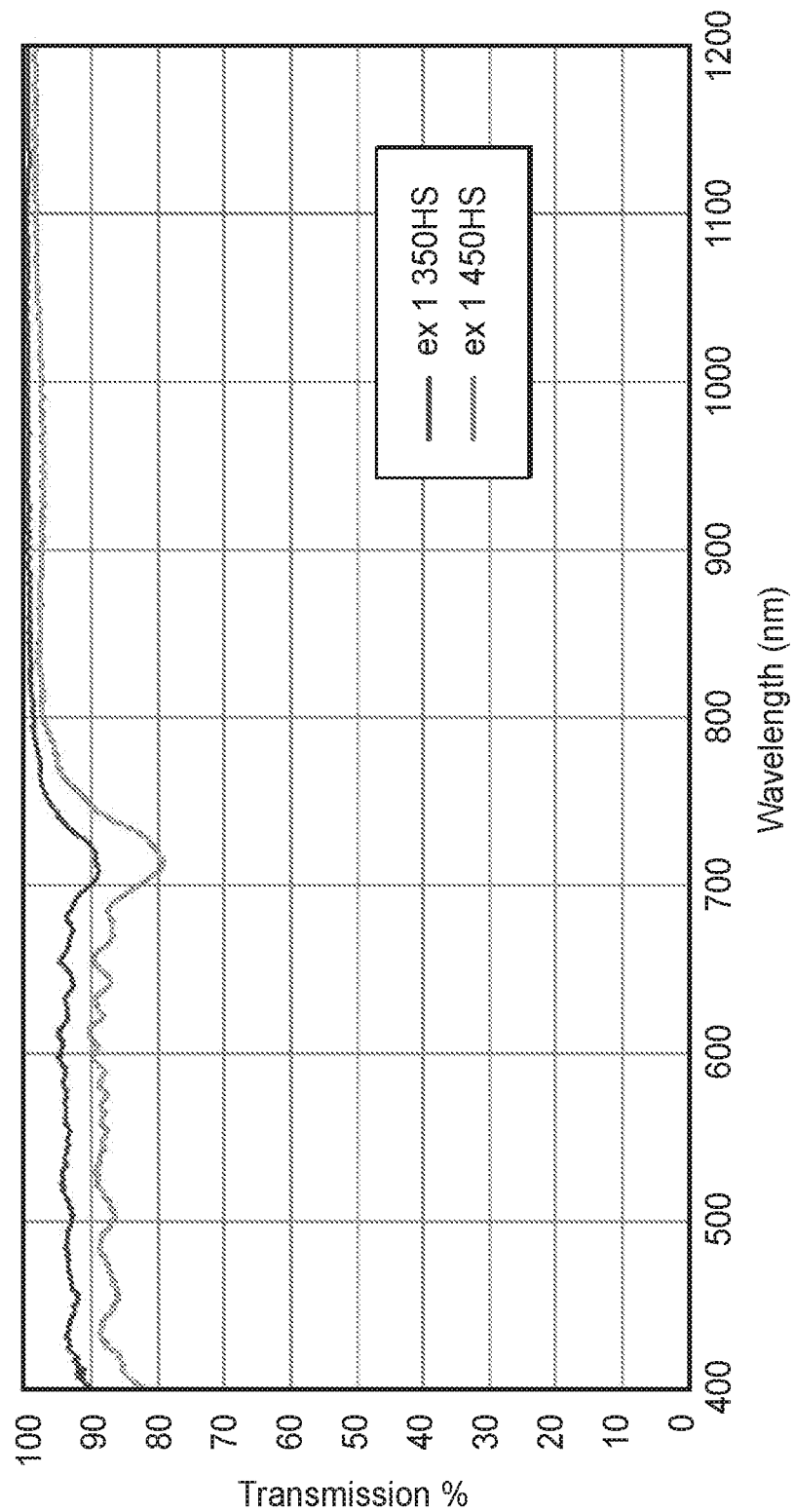
FIG. 3 is a graph of p-pol block state transmission at 60 degrees incidence before and after thermal stress exposure for Example 1.

The film of example 1 was then put in a frame to restrict shrinkage and heat treated in an oven of 450 degrees F. for 30 seconds. This heat treatment presumably provides sufficient annealing to remove residual crystallinity in the low index layer. As such, comparing transmission spectrum from before and after this stress exposure is expected to indicate the changes in residual crystallinity in the low index layer. The transmission of p-pol block state at 60 degrees before and after the stress exposure are shown in FIG. 3.

Example 2

Figure 4:
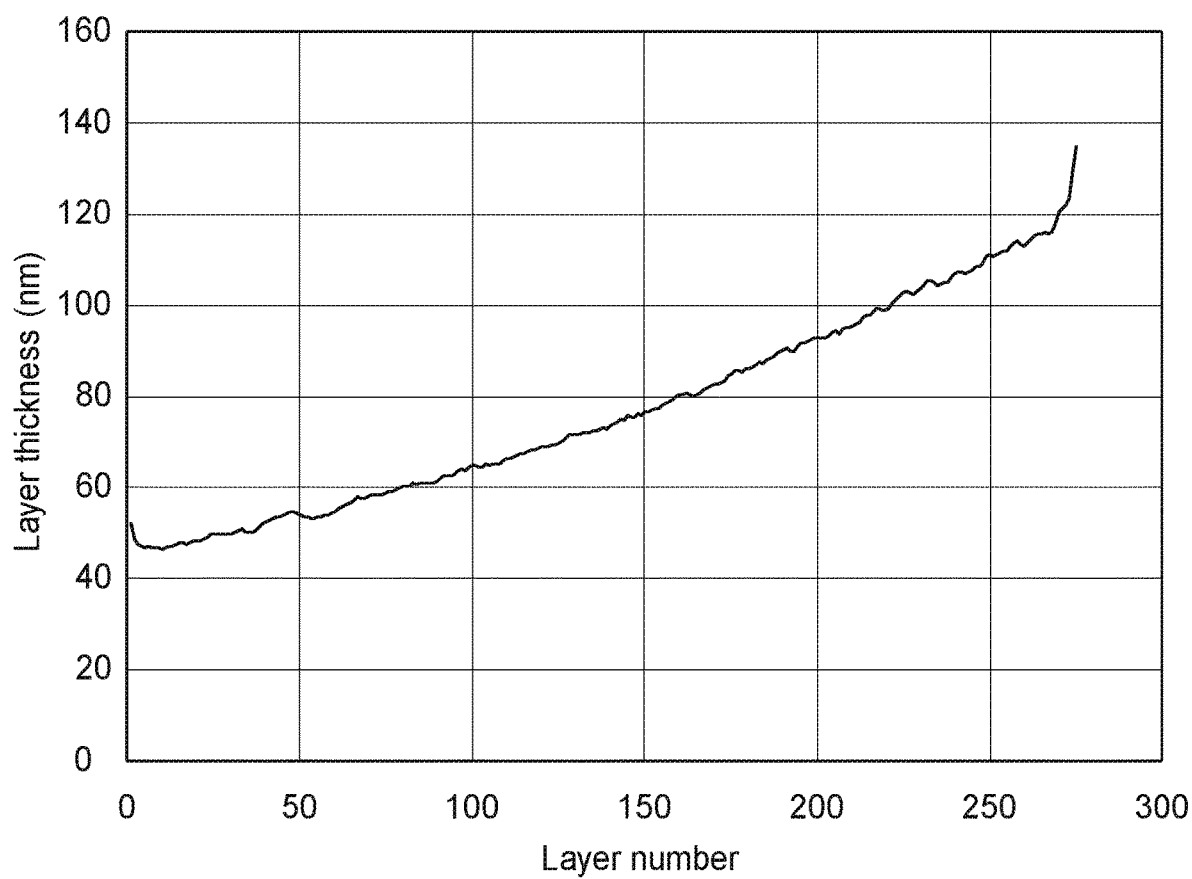
FIG. 4 is a graph of the layer thickness profile for Example 2.
Figure 5:
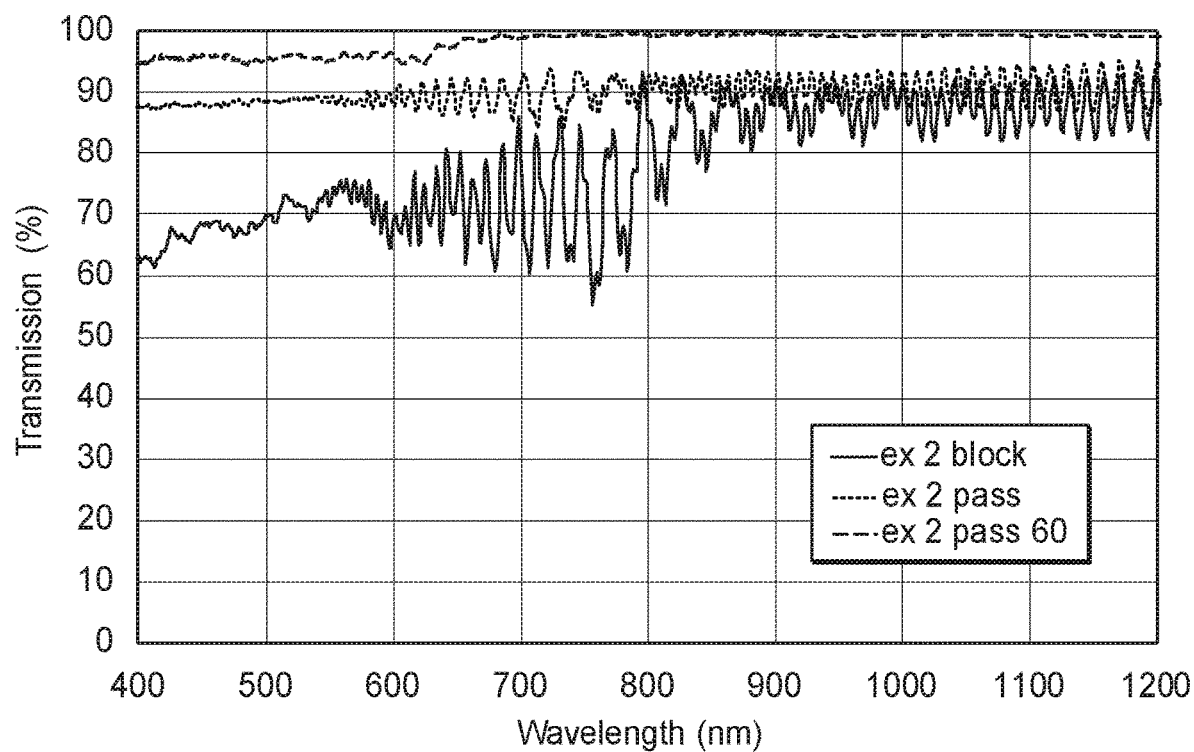
FIG. 5 is a graph of transmission spectra for Example 2.

A birefringent reflective polarizer was prepared as follows. Two polymers were used for the optical layers. The first polymer (first optical layers) was EASTAPAK PET 7352 available from Eastman Chemicals. The second polymer (second optical layers) was a 50:50 weight percent blend of polyethylene terephthalate glycol (PETG) GN071 from Eastman and VM318D PCTg from Eastman. The ratio of the feed rate of the first polymer to the second polymer was chosen to make the optical layers have a f-ratio of 0.65. The polymer used for the skin layers was EASTAPAK PET 7352. The materials were fed from separate extruders to a multilayer coextrusion feedblock, in which they were assembled into a packet of 275 alternating optical layers, plus a thicker protective boundary layer of the first optical layers, on each side, for a total of 277 layers. The skin layers of the second optical layer material were added to each side of the construction in a manifold specific to that purpose, resulting in a final construction having 279 layers. The multilayer melt was then cast through a film die onto a chill roll, in the conventional manner for polyester films, upon which it was quenched. The cast web was then stretched in a commercial scale linear tenter at a draw ratio approximately 6:1 and a temperature of 225 F in the stretching section. The heat set section had a temperature of 350 F. The layer thickness profile is shown in FIG. 4. The layer profile, first polymer and second polymer materials, and chosen process conditions led to the resulting pass and block state transmission spectra shown below in FIG. 5. This film has a resulting physical thickness as measured by a capacitance gauge of approximately 26.9 µm. The shrinkage measured at 302 F was 2.3% MD and 2.4% TD. For some end use applications the film would have nearly identical shrinkage for the orthogonal directions.

Figure 6:
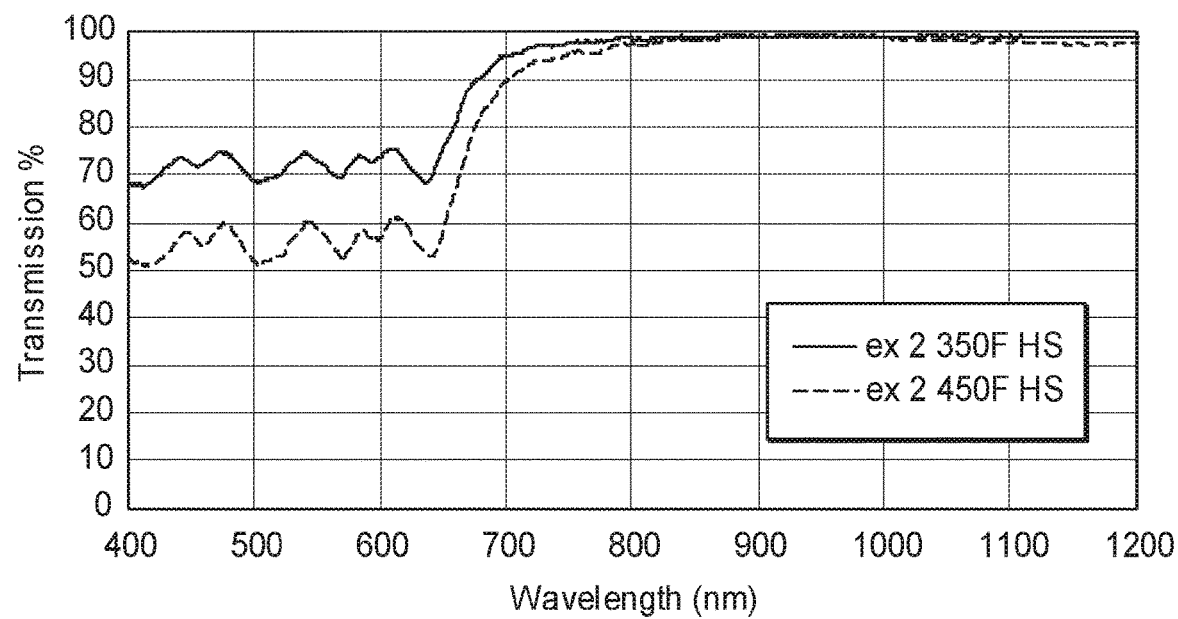
FIG. 6 is a graph of p-pol block state transmission at 60 degrees incidence before and after thermal stress exposure for Example 2.

Like example 1, the film of example 2 was then put in a frame to restrict shrinkage and heat treated in an oven of 450 degrees F. for 30 seconds for a heat treatment. The transmission of p-pol block state at 60 degrees before and after heat treatment are shown in FIG. 6.

Example 3

Figure 7:
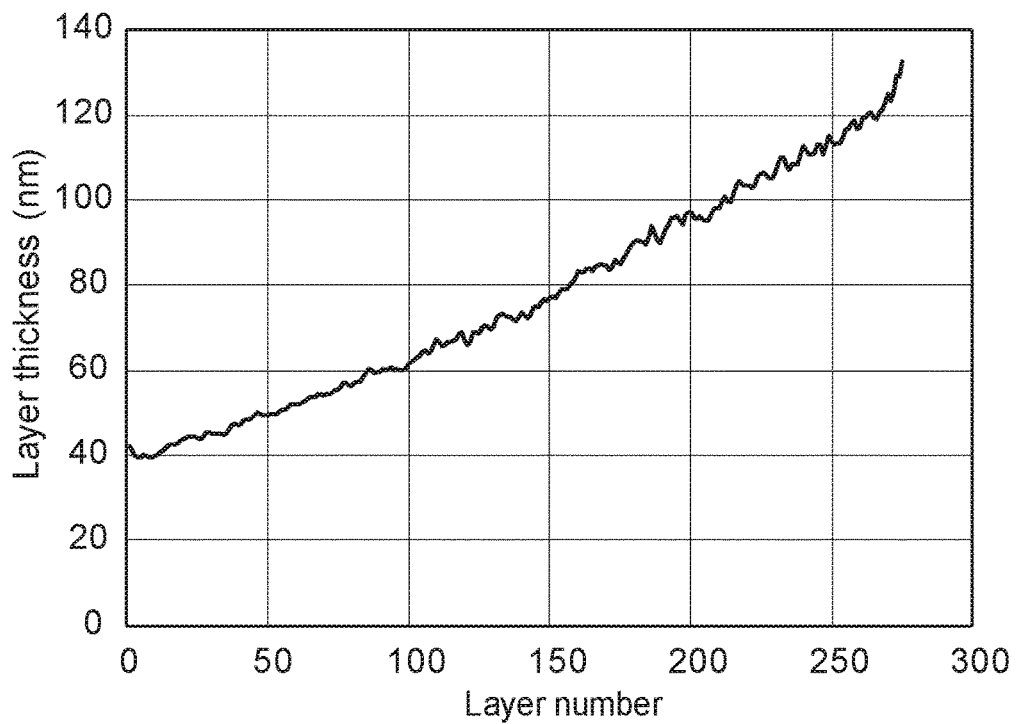
FIG. 7 is a graph of the layer thickness profile for Example 3.
Figure 8:
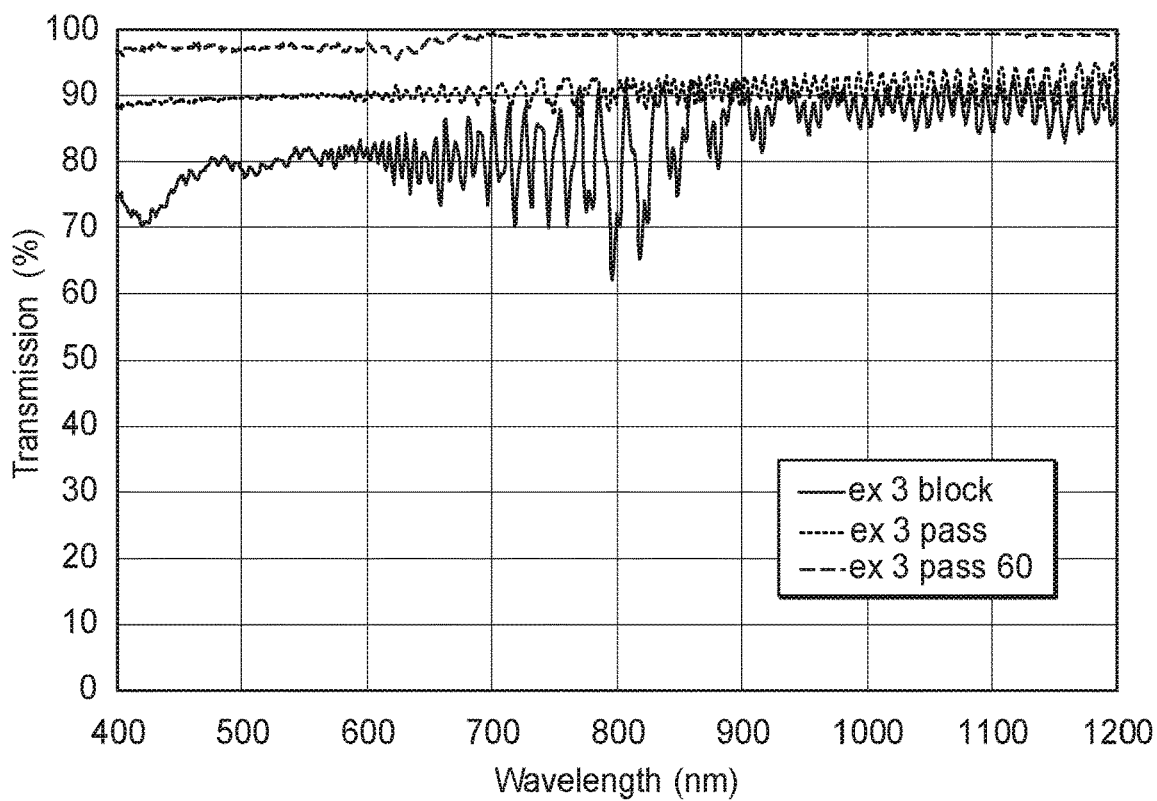
FIG. 8 is a graph of transmission spectra for Example 3
Figure 9:
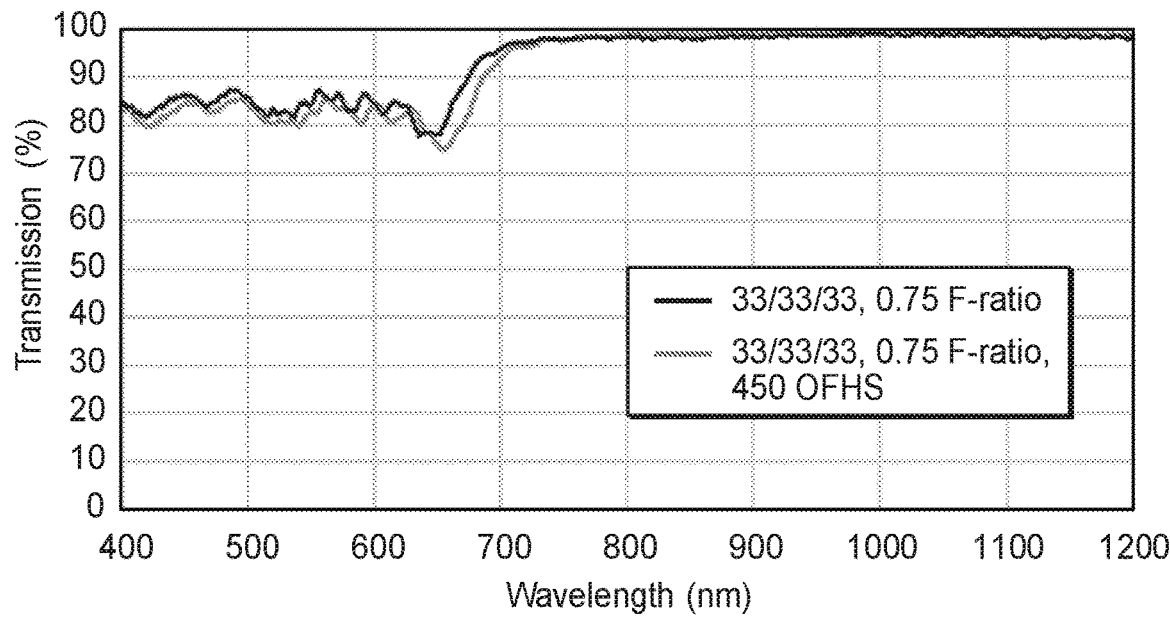
FIG. 9 is a graph of p-pol block state transmission at 60 degrees incidence before and after thermal stress exposure for Example 3.

A birefringent reflective polarizer was prepared as follows. Two polymers were used for the optical layers. The first polymer (first optical layers) was EASTAPAK PET 7352 available from Eastman Chemicals. The second polymer (second optical layers) was a 33:33:33 blend of Polyethylene Terephthalate Glycol (PETG) GN071 from Eastman, VM318D PCTG from Eastman Chemicals (Knoxville, TN), and 80:20 CoPET. The 80:20 CoPET is as pelletized an amorphous copolyester including of a molar ratio of the following:

40 mol % terephthalic acid
10 mol % isophthalic acid
49.75 mol % ethylene glycol
0.25 mol % trimethyl propanol The ratio of the feed rate of the first polymer to the second polymer was chosen to make the optical layers have a f-ratio of 0.65. The polymer used for the skin layers was EASTAPAK PET 7352. The materials were fed from separate extruders to a multilayer coextrusion feedblock, in which they were assembled into a packet of 275 alternating optical layers, plus a thicker protective boundary layer of the first optical layers, on each side, for a total of 277 layers. The skin layers of the second optical layer material were added to both sides of the construction in a manifold specific to that purpose, resulting in a final construction having 279 layers. The multilayer melt was then cast through a film die onto a chill roll, in the conventional manner for polyester films, upon which it was quenched. The cast web was then stretched in a commercial scale linear tenter at a draw ratio approximately 6:1 and a temperature of 225 F in the stretching section. The heat set section had a temperature of 350 F. The layer thickness profile is shown in FIG. 7. The layer profile, first polymer and second polymer materials, and chosen process conditions led to the resulting pass and block state transmission spectra shown in FIG. 8. This film has a resulting physical thickness as measured by a capacitance gauge of approximately 28.2 µm The film of example 3 was then put in a frame to restrict shrinkage and heat treated in an oven of 450 degrees F. for 30 seconds for a heat treatment. The transmission of p-pol block state at 60 degrees before and after thermal stress are shown in FIG. 9. The lack of evidence for shift after the heat treatment for example 3 indicates negligible shift in crystallinity state of low index layer and seems to correlate to improved thermal robustness of resulting multi-layer films.

The films of examples 1-3 were evaluated for refractive indices of each layer. The PET layer was measured directly on the outer film surface by Metricon. The refractive indices of the LIO layer were calculated by matching transmission measurements of the film to transmission calculations by 4×4 Berriman optical stack code. In each of the examples, significant birefringence exists in the LIO layers, implying significant crystallinity present.

It is notable and surprising that even though each of the examples 1-3 had similar birefringence of the LIO layer, example 3 was unchanged in transmission after 450 F heat set annealing. In examples 1-2, the change in transmission before to after annealing implies a change in crystallinity.

TABLE 1

|  |  |  | PET measured | | | LIO calculated | | |
| --- | --- | --- | --- | --- | --- | --- | --- | --- |
| Example | LIO material | fratio | nx | ny | nz | nx | ny | nz |
| example 1 | PETg LIO | 0.75 | 1.693 | 1.578 | 1.520 | 1.648 | 1.578 | 1.530 |
| example 2 | 50:50 PCTg:PETg LIO | 0.65 | 1.694 | 1.578 | 1.515 | 1.621 | 1.573 | 1.558 |
| example 3 | 33:33:33 PETg:PCTg:80-20 | 0.75 | 1.682 | 1.554 | 1.535 | 1.620 | 1.573 | 1.582 |

Examples 4-6

Examples 4-6 were made with a similar process to examples 1-3, but with the following differences:

TABLE 2

|  |  | PET measured | | |
| --- | --- | --- | --- | --- |
| LIO material | f ratio | nx | ny | nz |
| example 4 | PETg LIO | 0.5 | 1.692 | 1.577 | 1.52 |
| example 5 | PETg LIO | 0.5 | 1.694 | 1.58 | 1.52 |
| example 6 | 33:33:33 PETg:PCTg:80-20 | 0.55 | 1.694 | 1.579 | 1.515 |

Examples 7-9

Examples 1-6 were stretched with a conventional linear tenter process. Examples 7-9 were made with similar extrusion conditions to examples 1-6 except were stretched with the following parabolic tenter process as described in the Invited Paper 45.1, authored by Denker et al., entitled "Advanced Polarizer Film for Improved Performance of Liquid Crystal Displays," presented at Society for Information Displays (SID) International Conference in San Francisco, Calif., Jun. 4-9, 2006 or at temperatures and draw ratios similar to those described in 20070047080 A1 (Stover et al).

TABLE 3

| | LIO material | Stretch type | f ratio | MD Shrinkage (%) | TD Shrinkage (%) |
|---|---|---|---|---|---|
| example 1 | PETg LIO | linear | 0.75 | 2.1 | 1.9 |
| example 2 | 50:50 PCTg:PETg LIO | linear | 0.65 | 2.3 | 2.4 |
| example 3 | 33:33:33 PETg:PCTg:80-20 | linear | 0.75 | 2.3 | 1.9 |
| example 4 | PETg LIO | linear | 0.5 | 2.2 | 1.8 |
| example 5 | PETg LIO | linear | 0.5 | 1.8 | 1.2 |
| example 6 | 33:33:33 PETg:PCTg:80-20 | linear | 0.55 | 2.2 | 2.1 |
| example 7 | 33:33:33 PETg:PCTg:80-20 | parabolic | 0.5 | 7.3 | 2.9 |
| example 8 | 33:33:33 PETg:PCTg:80-20 | parabolic | 0.5 | 3.0 | 10.8 |
| example 9 | 33:33:33 PETg:PCTg:80-20 | parabolic | 0.65 | 3.8 | 3.6 |

Figure 10:
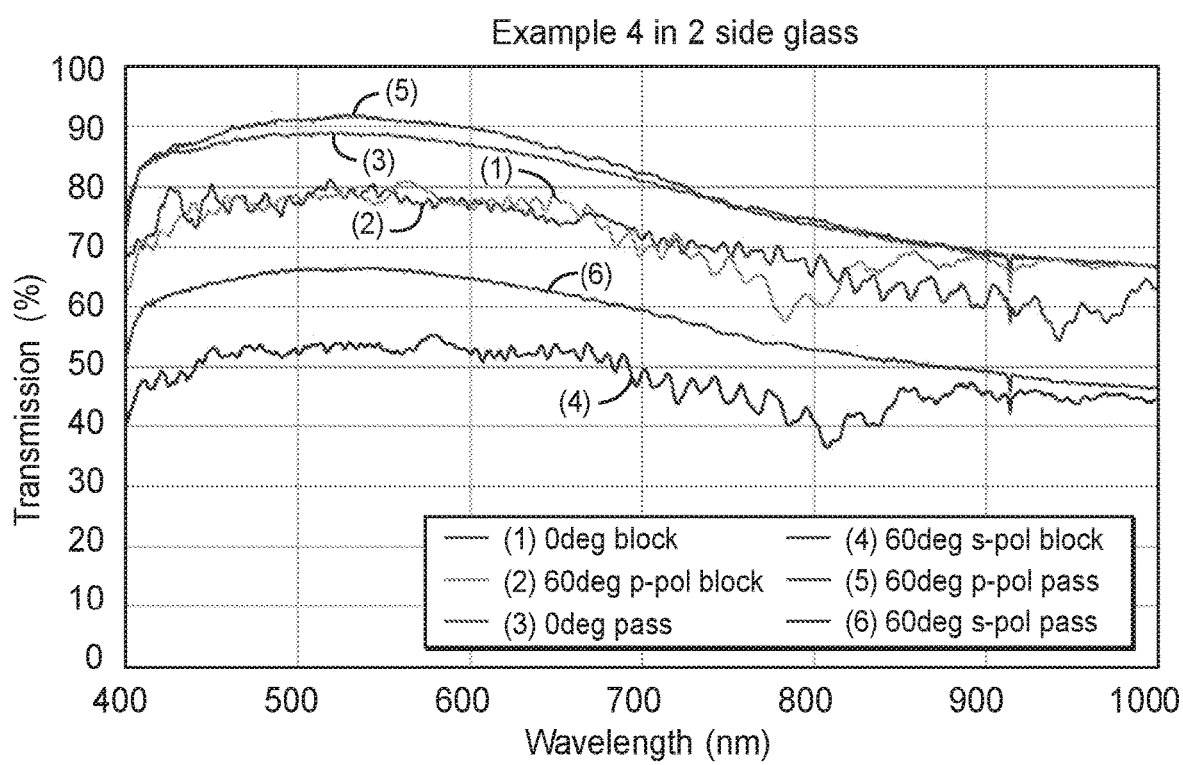
FIG. 10 is a graph of transmission spectra for Example 4 between glass sheets.
Figure 11:
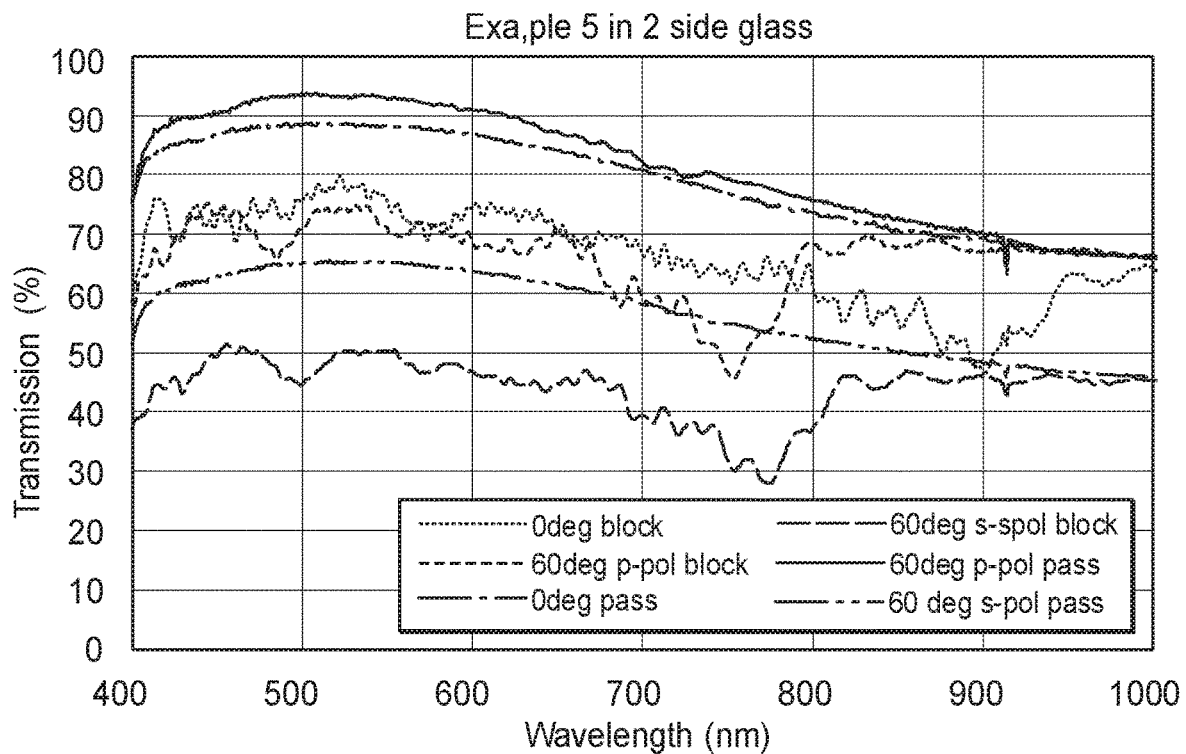
FIG. 11 is a graph of transmission spectra for Example 5 between glass sheets.
Figure 12:
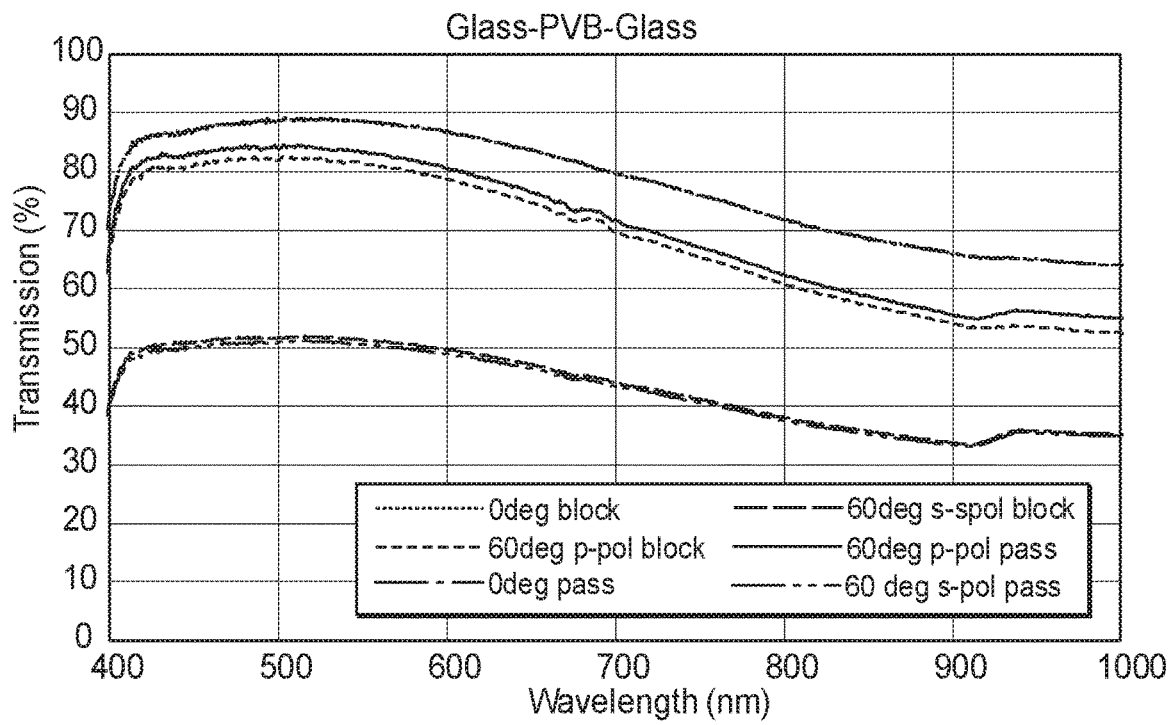
FIG. 12 is a graph of transmission spectra for two layers of glass with PVB interlayer.

The films of examples 1-9 where then laminated in between 1/8" thick soda lime glass sheets using PVB layers as adhesive. The transmission spectra for this glass encased construction of example 4 and example 5 are shown in FIGS. 10 and 11 respectively. FIG. 12 shows comparable spectra for glass laminate using only the PVB layer between the glass sheets.

Elevated Temperature Test

The example films were aged at elevated temperatures in ovens from 85 C, 95 C and 100 C. The haze was measured after 100 and 1000 hours and compared to room temperature aged films (RT); these results are listed in tables 4 and 5 respectively. When comparing similar materials, the films with higher crystalline content have less increase in haze with aging with thermal exposure.

TABLE 4 measured haze [%] after 100 hours thermal exposure

| | RT | 85 C. | 95 C. | 105 C. |
|---|---|---|---|---|
| example 1 | 0.143 | 0.017 | 0.053 | 1.140 |
| example 2 | 0.073 | 0.030 | 0.043 | 0.653 |
| example 3 | 0.163 | 0.097 | 0.057 | 0.397 |
| example 4 | 0.330 | 0.473 | 0.587 | 0.267 |
| example 6 | 0.047 | 0.143 | 0.113 | 0.787 |
| example 7 | 0.107 | 0.123 | 0.107 | 1.640 |
| example 8 | 0.160 | 0.080 | 0.373 | 1.073 |
| example 9 | 0.253 | 0.823 | 0.267 | 0.450 |

TABLE 5 measured haze [%] after 1000 hours thermal exposure

| | RT | 85 C. | 95 C. | 105 C. |
|---|---|---|---|---|
| example 1 | 0.05 | 0.25 | 1.11 | 1.68 |
| example 2 | 0.10 | 0.56 | 0.57 | 1.45 |
| example 3 | 0.07 | 0.49 | 0.74 | 1.29 |
| example 4 | 0.41 | 0.60 | 0.80 | 1.75 |
| example 6 | 0.05 | 0.69 | 0.97 | 2.27 |
| example 7 | 0.09 | 0.89 | 1.44 | 1.71 |
| example 8 | 0.25 | 0.40 | 0.82 | 0.86 |
| example 9 | 0.51 | 0.87 | 1.48 | 2.92 |

The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A multilayer reflective polarizer, comprising:
    a plurality of alternating first polymer layers and second polymer layers;
    wherein each of the first polymer layers and the second polymer layers exhibits crystallinity and has an in-plane birefringence of at least 0.01;
    wherein for at least one in-plane direction, the difference in refractive index between each of the first polymer layers and the second polymer layers is at least 0.04;
    wherein for a second in-plane direction orthogonal to the at least one in-plane direction, the difference in refractive index between each of the first polymer layers and the second polymer layers is less than 0.04; and
    wherein the multilayer reflective polarizer has at least four edges;
    wherein no index of refraction for either of the first or second polymer layers, measured at 550 nm, is greater than 1.7,
    wherein the second polymer layers comprises a first copolyester formed from at least one glycol-modified co(polyethylene terephthalate) and optionally a second copolyester, the first copolyester exhibiting crystallinity.

2. The multilayer reflective polarizer of claim 1, wherein an f-ratio of the multilayer reflective polarizer, defined as a ratio of an average optical thickness of the first polymer layers to the total optical thickness of both the first polymer layers and the second polymer layers, is at least 0.55.

3. The multilayer reflective polarizer of claim 2, wherein the f-ratio is at least 0.65.

4. The multilayer reflective polarizer of claim 2, wherein the f-ratio is at least 0.75.

5. The multilayer reflective polarizer of claim 1, wherein the first polymer layers include polyethylene terephthalate.

6. The multilayer reflective polarizer of claim 1, wherein the at least one glycol-modified co(polyethylene terephthalate) comprises a copolyester of polyethylene terephthalate with cyclohexane dimethanol used as a glycol modifier.

7. The multilayer reflective polarizer of claim 1, wherein the first copolyester of the second polymer layers is formed from the at least one glycol-modified co(polyethylene terephthalate) and the second copolyester.

8. The multilayer reflective polarizer of claim 1, further comprising at least one non-optical layer, wherein the at least one non-optical layer is a skin layer or a protective boundary layer.

9. The multilayer reflective polarizer of claim 8, wherein each of the at least one non-optical layer exhibits crystallinity.

10. The multilayer reflective polarizer of claim 1, wherein the multilayer reflective polarizer does not include any non-optical protective boundary layers within the plurality of alternating first polymer layers and second polymer layers.

11. The multilayer reflective polarizer of claim 1, wherein the multilayer reflective polarizer does not include any non-optical skin layers adjacent to the plurality of alternating first polymer layers and second polymer layers.

12. An optical laminate, comprising:
    a multilayer reflective polarizer as in claim 1; and
    a mirror film laminated to the multilayer reflective polarizer;

wherein the mirror film reflects less than 20% of visible light, and at least 80% of light from 900-1200 nm.

13. An automotive glass laminate, comprising an automotive glass layer and the optical laminate of claim 12.

14. The automotive glass laminate of claim 13, wherein the mirror film is disposed on an exterior side of the automotive glass layer and the multilayer reflective polarizer is disposed on an interior side of the automotive glass layer.

15. A glass laminate, comprising:
a multilayer reflective polarizer as in claim 1; and
a glass layer;
wherein the multilayer reflective polarizer is laminated to the glass layer.

16. The glass laminate of claim 15, wherein the glass layer is an automotive glass layer and the multilayer reflective polarizer is configured to reflect light polarized perpendicularly to a road surface as to be viewable with polarized sunglasses.

17. The glass laminate of claim 15, wherein the glass layer is an automotive glass layer and the multilayer reflective polarizer is configured to reflect light polarized parallel to a road surface as to reduce perceived glare off of the road surface.

18. The glass laminate of claim 15, wherein the glass layer is an architectural glass layer.

19. The glass laminate of claim 15, wherein the glass layer is an industrial glass layer.

\* \* \* \* \*